United States Patent
Kruspe et al.

[11] Patent Number: 6,114,851
[45] Date of Patent: Sep. 5, 2000

[54] TEMPERATURE COMPENSATED NUCLEAR MAGNETIC RESONANCE APPARATUS AND METHOD

[75] Inventors: Thomas Kruspe, Wienhausen, Germany; Robert A. Slade, Oxon, United Kingdom

[73] Assignee: Baker Hughes Incorporated, Houston, Tex.

[21] Appl. No.: 09/249,964

[22] Filed: Feb. 12, 1999

[51] Int. Cl.[7] .................................................. G01V 3/00
[52] U.S. Cl. ............................................. 324/303; 324/319
[58] Field of Search .................................. 324/303, 300, 324/312, 314, 307, 309, 318, 322, 319

[56] References Cited

U.S. PATENT DOCUMENTS

| | | | |
|---|---|---|---|
| 4,350,955 | 9/1982 | Jackson et al. | 324/303 |
| 4,595,878 | 6/1986 | Bradshaw | 324/300 |
| 4,717,876 | 1/1988 | Masi et al. | 324/303 |
| 4,933,638 | 6/1990 | Kenyon et al. | 324/303 |
| 5,280,243 | 1/1994 | Miller | 324/303 |
| 5,332,967 | 7/1994 | Shporer | 324/303 |
| 5,432,446 | 7/1995 | MacInnis et al. | 324/303 |
| 5,959,453 | 9/1999 | Taicher et al. | 324/303 |

*Primary Examiner*—Louis Arana
*Attorney, Agent, or Firm*—Madan, Mossman & Sriram, P.C.

[57] ABSTRACT

A method and apparatus for determining a characteristic of an earth formation surrounding a borehole in which a pulsed nuclear magnetic resonance (NMR) tool is received. A static magnetic field is produced in the borehole using at least two spaced-apart magnets in the NMR tool. The static magnetic field has a first region of substantially uniform magnetic intensity at a first location in the borehole, the first location in the borehole having a first temperature. The NMR tool is moved to a second location in the borehole having a second temperature, and a static magnetic field having a second region of substantially uniform magnetic is produced. The at least two spaced-apart magnets are controllably moved relative to each other wherein the first region of substantially uniform magnetic intensity and the second region of substantially uniform magnetic intensity are substantially equal in size and distance from the NMR tool.

37 Claims, 8 Drawing Sheets

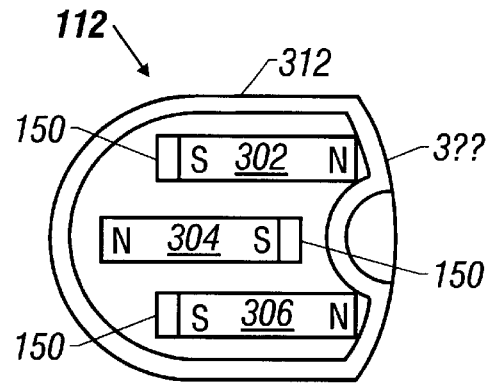
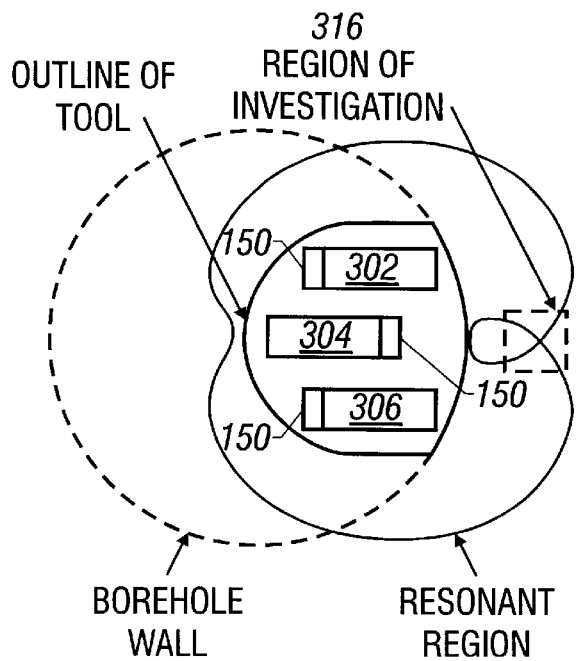
*FIG. 8A*  *FIG. 8B*
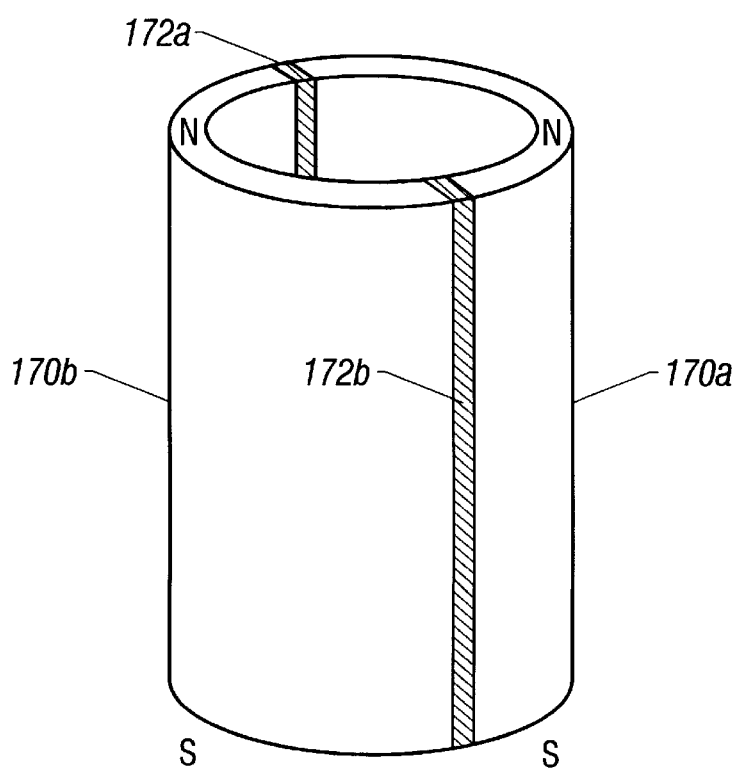
*FIG. 9*

TEMPERATURE COMPENSATED NUCLEAR MAGNETIC RESONANCE APPARATUS AND METHOD

BACKGROUND OF THE INVENTION

1. Field of the Invention

This invention relates to nuclear magnetic resonance and more particularly to a temperature compensated nuclear magnetic resonance apparatus and method.

2. Description of the Related Art

To obtain hydrocarbons such as oil and gas, a drilling assembly (also referred to as the "bottom hole assembly" or the "BHA") carrying a drill bit at its bottom end is conveyed into the wellbore or borehole. The drilling assembly is usually conveyed into the wellbore by a coiled-tubing or a drill pipe. In the case of the coiled-tubing, the drill bit is rotated by a drilling motor or "mud motor" which provides rotational force when a drilling fluid is pumped from the surface into the coiled-tubing. In the case of the drill pipe, it is rotated by a power source (usually an electric motor) at the surface, which rotates the drill pipe and thus the drill bit.

Bottom hole assemblies generally include several formation evaluation sensors for determining various parameters of the formation surrounding the BHA during the drilling of the wellbore. Such sensors are usually referred to as the MWD sensors. Such sensors traditionally have electromagnetic propagation sensors for measuring the resistivity, dielectric constant, water saturation of the formation, nuclear sensors for determining the porosity of the formation and acoustic sensors to determine the formation acoustic velocity and porosity. Other downhole sensors that have been used or proposed for use include sensors for determining the formation density and permeability. The bottom hole assemblies also include devices to determine the BHA inclination and azimuth, pressure sensors, temperature sensors, gamma ray devices, and devices that aid in orienting the drill bit in a particular direction and to change the drilling direction. Acoustic and resistivity devices have been proposed for determining bed boundaries around and in some cases in front of the drill bit. More recently, nuclear magnetic resonance (NMR) sensors have gained extreme interest as MWD sensors as such sensors can provide direct measurement for water saturation porosity and indirect measurements for permeability and other formation parameters of interest.

NMR sensors utilize permanent magnets to generate a static magnetic field in the formation surrounding the MWD tool. A radio frequency (RF) coil disposed between the magnets or around the magnets induces an RF magnetic field. The magnets and the RF coils are positioned so that the static and the RF fields are perpendicular to each other at least over a portion of the formation surrounding the NMR tool where the static field has a substantially uniform strength. This region is the region of interest or region of investigation. The NMR measurements corresponding to such region are needed to determine the formation parameters of interest. The NMR sensors should be designed so that region of investigation is constant, i.e., that the size and shape of this region remains the same throughout the investigation. However, the wellbore temperature increases with the depth. As the temperature increases, the permanent magnets lose strength, which reduces the size of the region of investigation and also moves it closer to the wellbore. At relatively high temperature wellbore depths, the region of investigation can overlap a part of the wellbore, which can severely affect the formation measurements due to the fluid in the wellbore. Thus, it is desirable to provide a system that will compensate for the reduction in the magnetic strength as a function of temperature.

The present invention provides MWD tools wherein the distance between opposing permanent magnets is adjusted as a function of temperature to so as to maintain at least a portion of the region of investigation substantially at constant distance from the tool body.

SUMMARY OF THE INVENTION

The present invention discloses a method and apparatus for determining a characteristic of an earth formation surrounding a borehole in which a pulsed nuclear magnetic resonance (NMR) tool is received. A static magnetic field is produced in the borehole using at least two spaced-apart magnets in the NMR tool. The static magnetic field has a first region of substantially uniform magnetic intensity at a first location in the borehole, the first location in the borehole having a first temperature. The NMR tool is moved to a second location in the borehole having a second temperature, and a static magnetic field having a second region of substantially uniform magnetic is produced. The at least two spaced-apart magnets are controllably moved relative to each other wherein the first region of substantially uniform magnetic intensity and the second region of substantially uniform magnetic intensity are substantially equal in size and distance from the NMR tool.

Preferably, the at least two spaced-apart magnets are controllably moved using at least one temperature sensitive element positioned adjacent said spaced-apart magnets. The temperature sensitive element is, for example, a shape memory alloy element, a plurality of stacked shape memory alloy elements, or a bimetallic element. The shape memory alloy elements change shape and dimension at pre-defined temperatures and allow for controllable and predictable movement of the magnets during temperature transitions. In an alternative embodiment, a second element, such as additional shape memory alloy elements or resilient elements, such as springs, are used to aid in controllably moving the at least two spaced-apart magnets.

A radio frequency (RF) magnetic field is produced using an RF antenna in the NMR tool in at least one of the first location in the borehole and the second location in the borehole, the RF magnetic field having a direction orthogonal to a direction of the static magnetic field. An induced signal is received relating to a parameter of interest in the formations.

BRIEF DESCRIPTION OF THE DRAWINGS

The present invention may be better understood, and its numerous objects, features, and advantages made apparent to those skilled in the art by referencing the accompanying drawings.

FIGS. 8A and 8B are cross sections of another embodiment of an NMR tool illustrating the use of shaped memory alloy (SMA) elements in accordance with the present invention;

FIG. 9 is a view of another configuration of the permanent magnets of an NMR tool using SMA elements in accordance with the present invention.

The use of the same reference symbols in different drawings indicates similar or identical items.

DESCRIPTION OF THE PREFERRED EMBODIMENT(S)

Figure 1A:
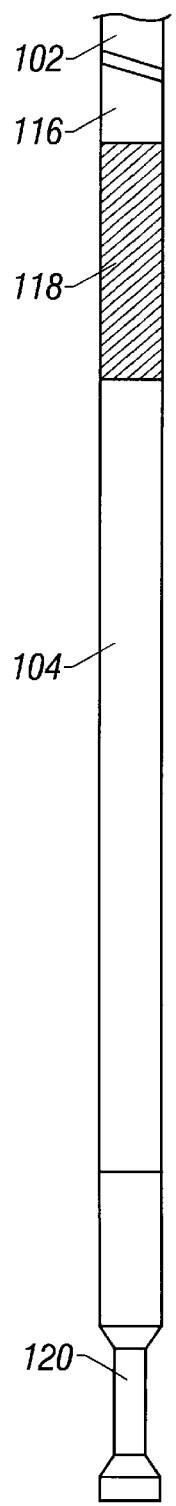
FIGS. 1A–1C are side elevational views partially in section (see FIG. 1A) of a drilling assembly including an NMR tool in accordance with the present invention.
Figure 1B:
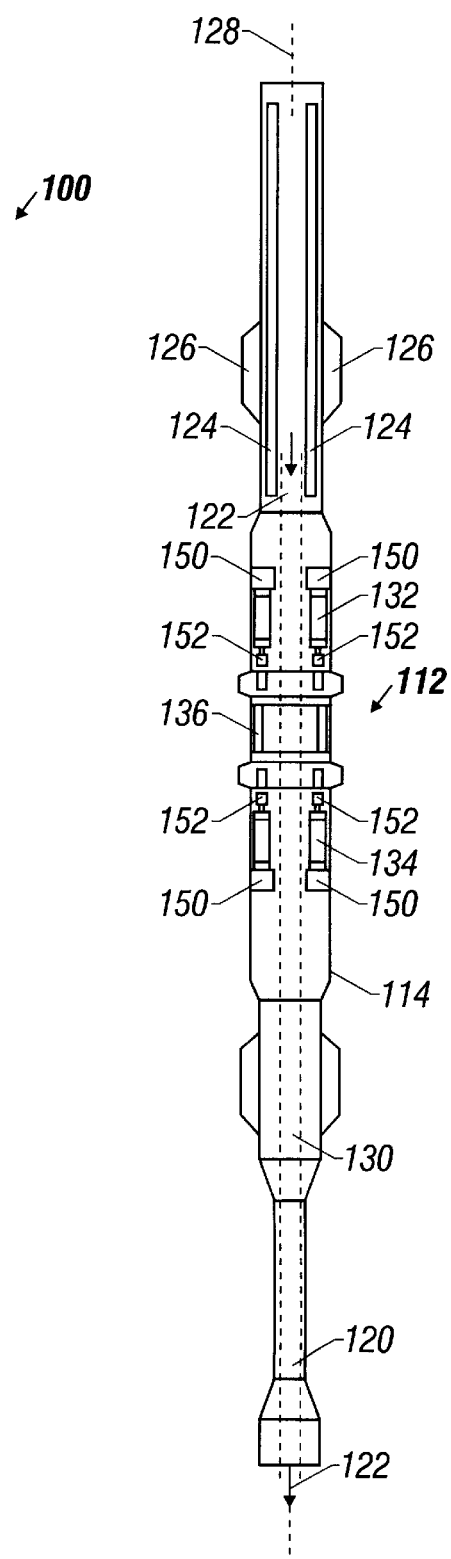
Figure 1C:
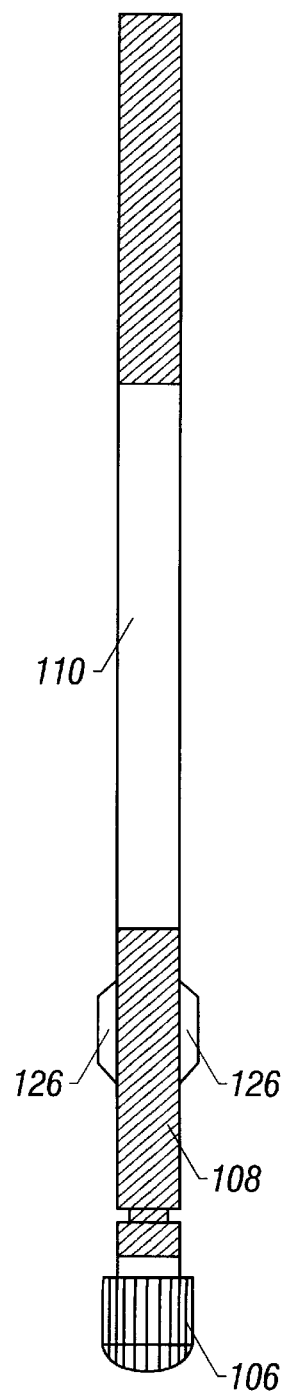

Referring to FIGS. 1A–1C, a drilling assembly 100 at the end of a drill string 102 or coiled tubing is illustrated according to the present invention. A measurement-while-drilling (MWD) tool 104, an associated pulsed nuclear magnetic resonance (NMR) tool 112 (contained within a housing 114) and electronic circuitry 124, and a pulsed power unit 118 are connected in tandem in the drilling assembly 100. Flex subs 120 are used for example in connecting the MWD tool 104 and the NMR tool 112 in the drilling assembly 100. The MWD tool 104 may also include a sonic sensor, a density measurement tool, and a porosity measurement tool. A communication sub 116 using, for example, two-way telemetry, is also provided as illustrated in the drilling assembly 100.

The drilling assembly 100 includes a drill bit 106, bearing assembly 108, and downhole mud motor 110. The drill string 102 includes, for example, sections of drill pipe connected end-to-end or a generally continuous coiled tubing (as described in greater detail in FIG. 9). The borehole typically contains a drilling fluid 122 or "mud" which is forced through the drill string 102 and the bottom hole drilling assembly 100 through the drill bit 106. A channel 130 within the drill string 102 and drilling assembly 100 allows the drilling fluid 122 through the drill string 102 and drilling assembly 100. The drilling fluid acts to lubricate the drill bit 106 and to carry borehole cutting or chips away from the drill bit 106.

The communication sub 116, power unit 118, MWD tool 104, and NMR tool 112 are all connected in tandem with the drill string 102. Such subs and tools form a bottom hole drilling assembly 100 between the drill string 102 and the drill bit 106. Stabilizers 126 are used to stabilize and center the drilling assembly 100 and tools within the borehole. The housing 114, for example, a drilling collar, is made of a nonmagnetic alloy. The drilling assembly 100 makes various measurements including pulsed nuclear magnetic resonance measurements while the borehole is being drilled. As seen in FIG. 1B, the NMR tool is rotationally symmetric about a longitudinal axis 128 of the drilling assembly 100.

Figure 2:
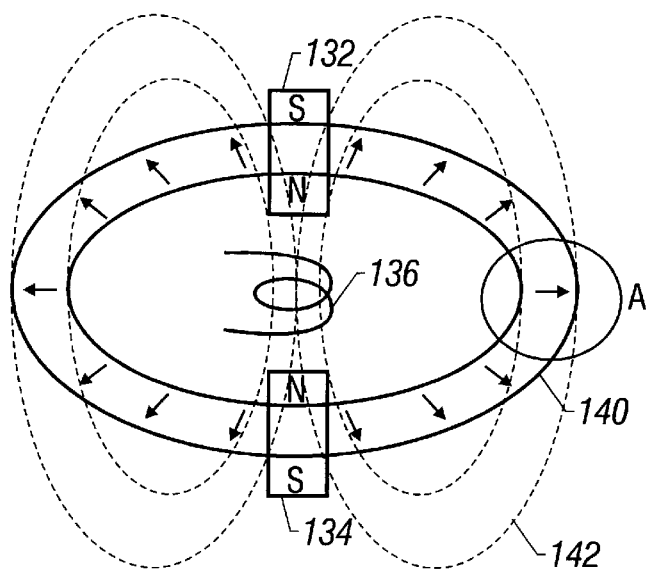
FIG. 2 illustrates the production of a toroidal region of homogeneous radial magnetic field perpendicular to a pair of axially aligned magnets having like adjacent poles and the application of a pulsed RF field to the magnetization.
Figure 4:
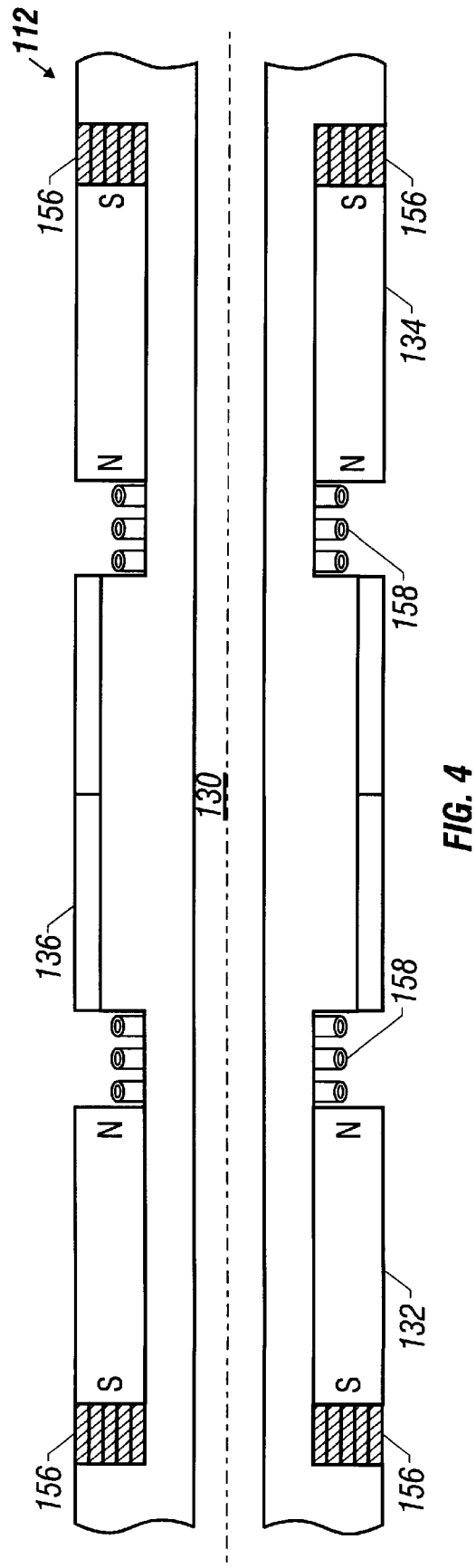
FIG. 4 is a longitudinal section of an embodiment of an NMR tool illustrating the use of shaped memory alloy (SMA) elements in accordance with the present invention.
Figure 5:
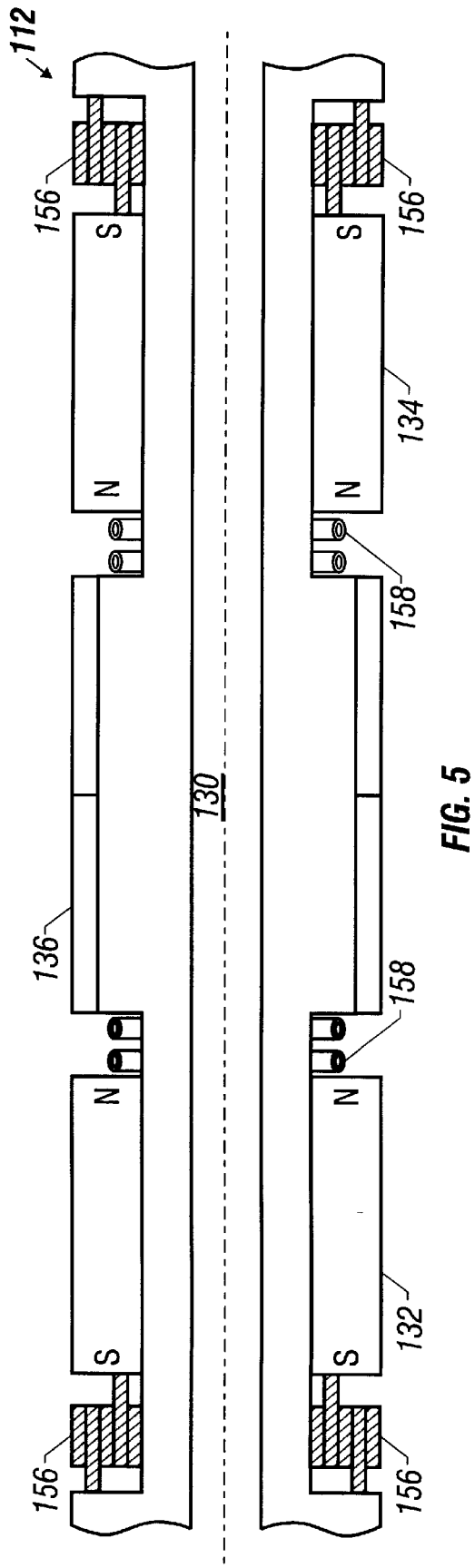
FIG. 5 is a longitudinal section of the NMR tool illustrating the SMA elements having an extended length with high temperature.

The pulsed NMR tool 112 includes at least two spaced-apart magnets 132 and 134 housed in the drilling assembly 100 and within the NMR tool 112 for producing a static magnetic field having a region of substantially uniform magnetic intensity in the vicinity of the borehole. The at least two spaced-apart magnets 132 and 134 illustrated in FIGS. 2, 4 and 5 are tubular in shape and arranged coaxially within the NMR tool 112 and to surround the channel 130. A radio frequency (RF) transmitting antenna or coil 136 also surrounds the channel 130 and is located, for example, between the two spaced-apart magnets 132 and 134. The RF coil 136 is connected to a suitable RF pulse transmitter such as the pulsed power unit 118 for providing power at selected frequencies and electronic driving circuitry 124 which drives the RF transmitting antenna or RF coil 136. The RF coil 136 is pulsed and creates a high frequency RF field orthogonal to the static magnetic field.

The at least two magnets 132 and 134 are permanently magnetized, for example, in the axial direction and, in one embodiment, are positioned in opposing directions, as shown in FIGS. 2, 4 and 5. As shown in FIGS. 2, 4 and 5, like magnetic poles, for example, the north magnetic poles of the two magnets 132 and 134 face one another for producing a toroidal region of homogeneous radial magnetic field 140 (see FIG. 2) perpendicular to the pair of axially aligned magnets 132 and 134.

FIG. 2 further illustrates the production of the toroidal region of homogeneous radial magnetic field 140 perpendicular to the axially aligned magnets 132 and 134. The pulsed RF coil 136 creates the pulsed RF field 142 illustrated by dashed lines. The distance of the toroidal region 140 of homogeneous radial magnetic field from the axis of the magnets 132 and 134 is dependent upon the strength of the magnets 132 and 134 and the distance between like poles of the magnets 132 and 134. Rock pores (not shown) in the earth formations are filled with fluid, typically water or hydrocarbon. The hydrogen nuclei in the fluid are aligned in the region of homogeneous magnetic field 140, generated by the magnets 132 and 134. The hydrogen nuclei are then "flipped" away from the homogeneous magnetic field 140 by the pulsed RF field 142 produced by RF coil 136. At the termination of the pulsed RF field from RF coil 136, the hydrogen nuclei revolve or precess at high frequency around the homogeneous magnetic field 140 inducing an NMR signal in the RF coil 136 until the hydrogen nuclei relax to the original direction along the homogeneous magnetic field 140. The induced NMR signals are sent to the surface for processing or can be processed by a downhole processor (not shown).

In an alternative embodiment, the at least two magnets 132 and 134 are permanently magnetized in the axial direction and are positioned in the same direction. For example, opposing magnetic poles, for example, the north magnetic pole of one magnet 134 faces the south magnetic pole of the other magnet 132 for producing a static magnetic field having a region of substantially uniform magnetic intensity in a longitudinal direction and parallel to the pair of axially aligned magnets 132 and 134. In such a magnetic assembly, the RF coil 136 is pulsed and creates a high frequency RF field in the radial direction, orthogonal to the static magnetic field, for producing a region or volume of interest for NMR signal sensitivity.

The region or volume of interest for NMR signal sensitivity is focused as indicated in FIG. 2 as Zone A for the at least two magnets 132 and 134 positioned in the opposing direction. The RF frequency necessary to excite the hydrogen nuclei in the earth formations depends on the strength of the magnetic field 140 and the sensitive volume, Zone A, is determined by a specific relationship between the strength of the magnetic field 140 and the frequency of the RF pulses. During the downhole application of the drilling assembly 100, the drilling assembly 100 and the NMR tool 112 encounter various temperatures at various depths. The magnetic field 140 strength decreases with an increase in temperature because the material of the permanent magnets 132 and 134 suffer from a degradation over temperature and the strength of the magnets 132 and 134 can not be increased downhole.

Figure 3:
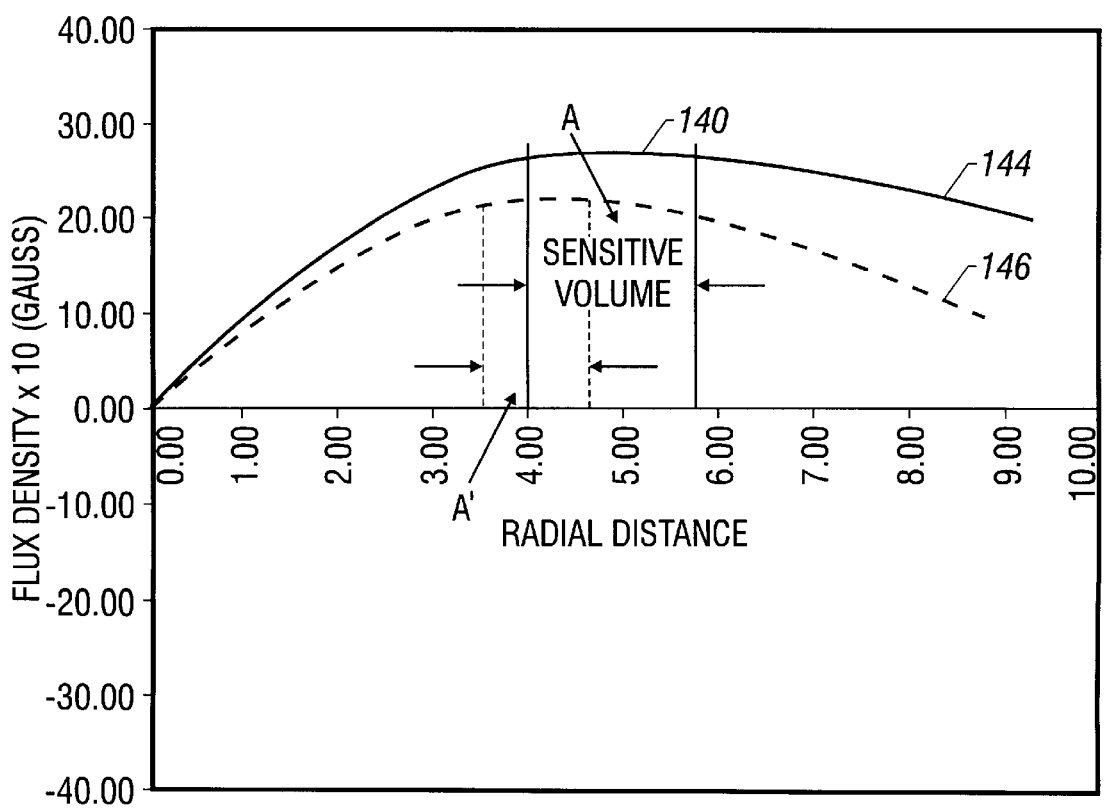
FIG. 3 is a graph illustrating magnetic field flux density as a function of radial distance and the shift of the magnetic field due to an increase in temperature of the permanent magnetic structure.

The sensitive volume, Zone A, is shown for a normal temperature in the graph of FIG. 3 showing flux density as a function of radial distance from the axis of the magnets 132 and 134 and the NMR tool 112. The strength of the magnetic field 144 produced on the midplane between the poles increases from zero on the axis of the magnets 132 and 134 to a maximum, and then decays as the distance from the axis of the magnets 132 and 134 increases. Furthermore, the magnetic field 144 is a constant maximum value over a short distance measured radially from the axis of the magnets 132 and 134. Thus, at the location of the maximum flux density a narrow region of uniform magnetic field 140 is created. However, the degradation of the magnets 132 and 134 as the temperature increases changes the static magnetic field and creates a magnetic field 146 decreased in strength. Thus, the location or distance of the sensitive volume, Zone A', is shifted closer to the axis of the magnets 132 and 134 and the NMR tool 112 and thus closer to the borehole. The width and size of the sensitive volume, Zone A' also becomes smaller. This is a disadvantage in the measurement of the earth formations as the sensitive volume, Zone A', reaches an area close to the borehole and is influenced by the drilling fluid. Although particularly described for a toroidal region of static magnetic field as shown in FIG. 2, the changes with respect to temperature of the magnet assembly and thus the static magnetic field and region or volume of interest for NMR signal sensitivity occurs in numerous magnet assembly arrangements.

In order to retain the sensitive volume, Zone A, constant in size and in distance from the NMR tool 112, the NMR tool of the present invention controllably moves the at least two spaced-apart magnets 132 and 134 relative to each other (for example, against each other or against the earth formation) and relative to the increase or decrease in temperature to maintain the region of the static uniform magnetic field at a substantially equal size and distance from the NMR tool 112 at a first location in the borehole to a second location in the borehole. When the region of the static uniform magnetic field is maintained substantially constant, the sensitive volume of interest or Zone A is also maintained substantially constant.

The controlled movement of the magnets 132 and 134 is accomplished using at least one temperature sensitive element, which predictably expands and/or contracts with a change in temperature. In FIG. 1, a set of temperature sensitive elements 150 are positioned in the NMR tool 112 located adjacent to each of the magnets 132 and 134. Although a set of temperature sensitive elements 150 are illustrated, a single temperature sensitive element can be used, for example, positioned between the at least two magnets 132 and 134. Alternatively, as illustrated in FIG. 1, the temperature sensitive elements 150 are, preferably, positioned in the NMR tool 112 adjacent the outside ends or poles of the magnets 132 and 134. The spaced-apart magnets 132 and 134 are moved closer together under higher temperatures resulting in a static magnetic field which remains substantially constant in strength and dimension maintaining the static magnetic field a substantially constant size and distance from the NMR tool 112. During a decrease in temperature, the magnets 132 and 134 are moved farther apart and, for instance, the temperature sensitive elements 150 return to the original position such that the static magnetic field continues to remain substantially constant in strength and dimension. During the decrease in temperature, a second set of elements 152, for example, resilient elements such as springs or additional temperature sensitive elements, may be used to aid in moving the two magnets 132 and 134 farther apart and returning the magnets 132 and 134 to the original position. The second set of elements 152, for instance, is located adjacent to the facing like poles of the magnets 132 and 134, between the magnets 132 and 134 and the RF coil 136. Alternatively, a single element such as a single spring can be positioned between the magnets 132 and 134 to aid in moving the two magnets 132 and 134 farther apart and returning the magnets 132 and 134 to the original position. The temperature sensitive elements 150 are, for example, bimetallic elements or, preferably shaped memory alloy (SMA) elements.

SMA elements posses the property of changing crystalline structure with a certain transition temperature. A change in size is coupled to a change in metal structure such that a martensitic structure transforms, at a pre-defined temperature, into an austenitic structure during heating and reverts to the martensitic structure when the temperature decreases. Specific shapes may also be associated with each of the SMA metal structures. Therefore, with a change in temperature, the SMA elements also change in shape and dimension. Examples of such SMA elements are made of Ni-Ti or Cu-Zn-Al. The elongation or shrinkage during temperature transitions can reach 3–4%. The transformation of the SMA elements occurs in a relatively small temperature range, which can be chosen anywhere below approximately 200° C.

A preferred embodiment is described in greater detail in FIGS. 4 and 5. FIG. 4 is a cross section of the NMR tool 112 illustrating a set of SMA elements 156 in accordance with the present invention while the NMR tool 112 is used in a low or normal temperature application at a first location in the borehole. FIG. 5 is a cross section of the NMR tool 112 illustrating the SMA elements 156 having an extended length in a high temperature application at a second location in the borehole. In FIGS. 4 and 5, the SMA elements 156 surround the channel 130 and are located adjacent the outside ends or poles of the two tubular magnets 132 and 134. A set of resilient elements 158 such as the springs shown, are located adjacent the facing like poles of the two tubular magnets 132 and 134, between the magnets 132 and 134 and the RF coil 136.

Figure 6:
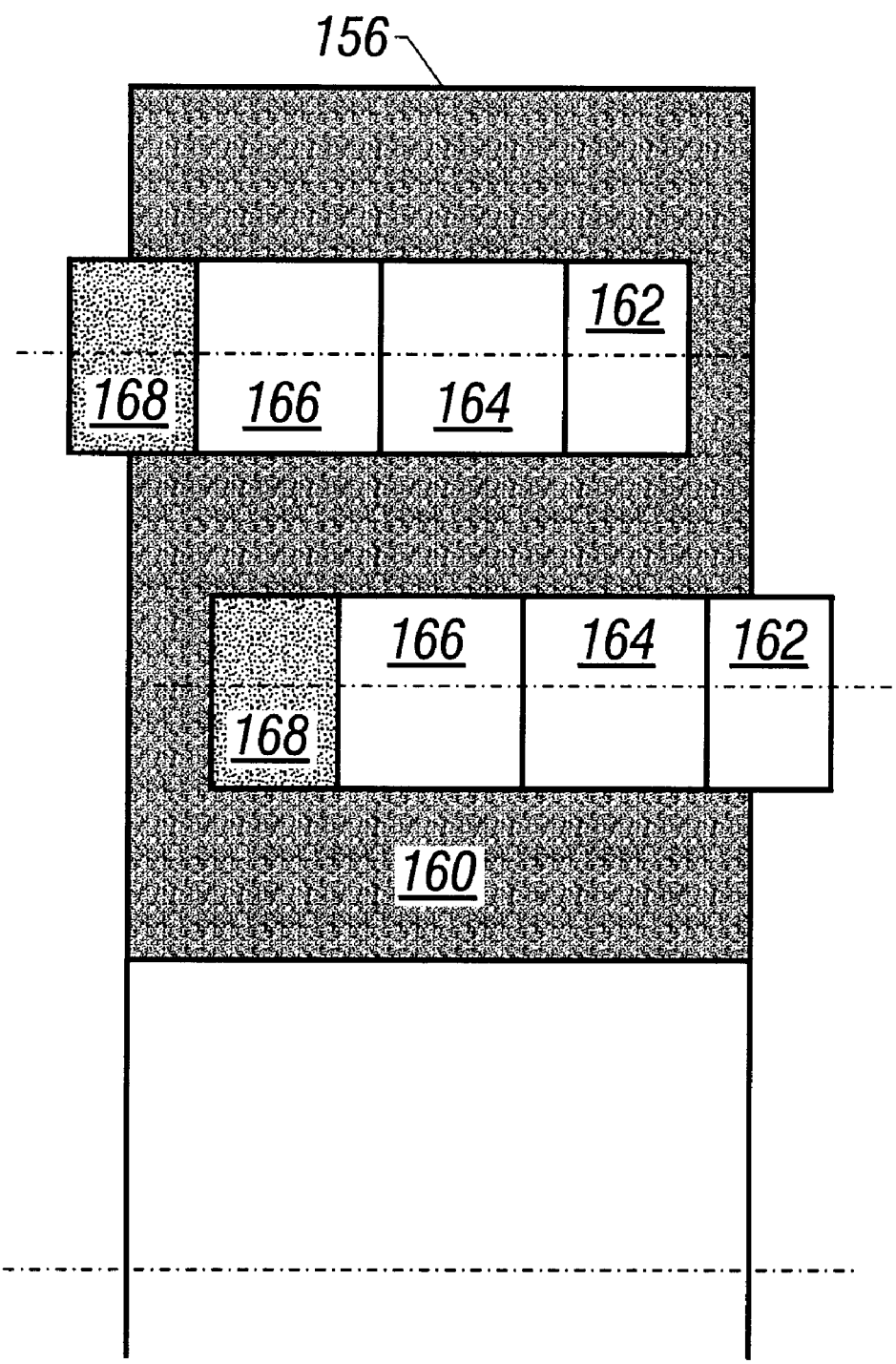
FIG. 6 illustrates a stacked SMA element.

At predefined temperature increases the SMA elements 156 change in shape and dimension, such as extending lengthwise along a longitudinal axis of the NMR tool 112, moving the magnets 132 and 134 closer together and compressing the resilient elements 158. As the magnets move closer together in the higher temperatures, the sensitive volume of interest, Zone A, of the toroidal region of homogeneous magnetic field 140 as shown in FIG. 2 remains substantially constant in dimensions and strength. As the temperature again decreases, the SMA elements 156 again change in shape and dimension, such as contracting lengthwise into the original shape and dimension, and the resilient elements 158 aid in sliding the magnets 132 and 134 back to the original position such that the sensitive volume of interest, Zone A, again remains substantially constant in dimensions and strength. The temperature transition and associated change in size of the SMA elements 156 occurs in a relatively narrow temperature band of, for example, 5°K. The transition temperature depends on the composition of the SMA elements chosen for the NMR tool 112. Thus, the SMA elements 156 may be tailored to pre-defined transition temperatures. The resilient elements 158 can be replaced by additional SMA elements having properties such that, during a decrease in temperature, the additional SMA elements aid in sliding the magnets 132 and 134 back to the original position. In another embodiment of the present invention, illustrated in FIG. 6, the SMA elements 156 include a stack of metal discs made of different shape memory alloys having different transition temperatures for expansion. For example, the SMA elements 156 include a frame 160, a first SMA element 162, a second SMA element 164, a third SMA element 166, and a fourth SMA element 168. The first SMA element 162 expands at temperature T1 by a predefined amount L1, which will move the magnets 132 and 134 closer to the RF coil 136 a distance L1. At T2, where T2 is greater than T1, the second SMA element 164 will expand by length L2, which will move the magnets 132 and 134 closer to the RF coil 136 a distance L1+L2+. At T3, where T3 is greater than T2, the third SMA element 166 will expand by length L3, which will move the magnets 132 and 134 closer to the RF coil 136 a distance L1+L2+L3. At T4, where T4 is greater than T3, the fourth SMA element 168 will expand by length L4, which will move the magnets 132 and 134 closer to the RF coil 136 a distance L1+L2+L3+L4. The system illustrated in FIG. 6 provides a step increase in movement of the magnets 132 and 134 at discrete and predefined temperature increases. Any suitable arrangement and positioning of the different shape memory alloys may be used for optimum controlled movement of the magnet assembly. FIG. 6 simply illustrates one embodiment of stacked shape memory alloys.

Although the temperature compensated NMR system of the present invention is described for a measurement-while-drilling type of NMR tool and sensor, the system of the present invention is equally applicable to be used in wireline logging systems as well.

The apparatus of the present invention is not limited to the illustrated magnet assembly and arrangement. For example, in another embodiment, the at least one pair of magnets 132 and 134 can include a plurality of stacked tubular permanent magnets aligned with the longitudinal axis 128 of the NMR tool 112. The stacked tubular magnets can be arranged in pairs on opposite sides of a symmetry plane (see the magnets 132 and 134 shown in FIG. 2) with magnetic poles of each pair of magnets in opposition. A cylinder of ferrite (a ferrite yoke) may be placed between the tubular magnets for concentrating the magnetic flux. The static magnetic field produced by the magnet/yoke arrangement is a toroidal radial magnetic field centered on the longitudinal axis 128 of the NMR tool 112. However, the static magnetic field can also be produced in the longitudinal direction as previously describe, wherein the at least two spaced-apart magnets have opposing magnetic poles facing each which creates a static magnetic field in the longitudinal direction. It will also be clearly apparent to those skilled in the art that the identical homogeneous radial magnetic field area can also be obtained if the magnets 132 and 134 are dc energized electromagnets, or superconducting dc electromagnets.

In each embodiment, whether the static magnetic field is in the radial direction or the longitudinal direction, the RF field produced is orthogonal to the static magnetic field direction. In each embodiment of the present invention, the at least two spaced-apart magnets are controllably moved relative to each other and relative to temperature changes at different locations in the borehole. The at least two spaced-apart magnets are controllably moved such that the region of substantially uniform magnetic intensity of the static magnetic field is maintained substantially equal in size and distance from the NMR tool at different locations in the borehole having different temperatures.

The apparatus of the present invention is also not limited to the illustrated sensor assembly and RF coil arrangement. Any number of appropriate antenna or coil arrangements which provide an RF field orthogonal to the static magnetic field direction for creating the region of interest for NMR signal sensitivity can be used according to the present invention. For example, the NMR tool can employ separate transmitter and receiver coils.

Figure 7A:
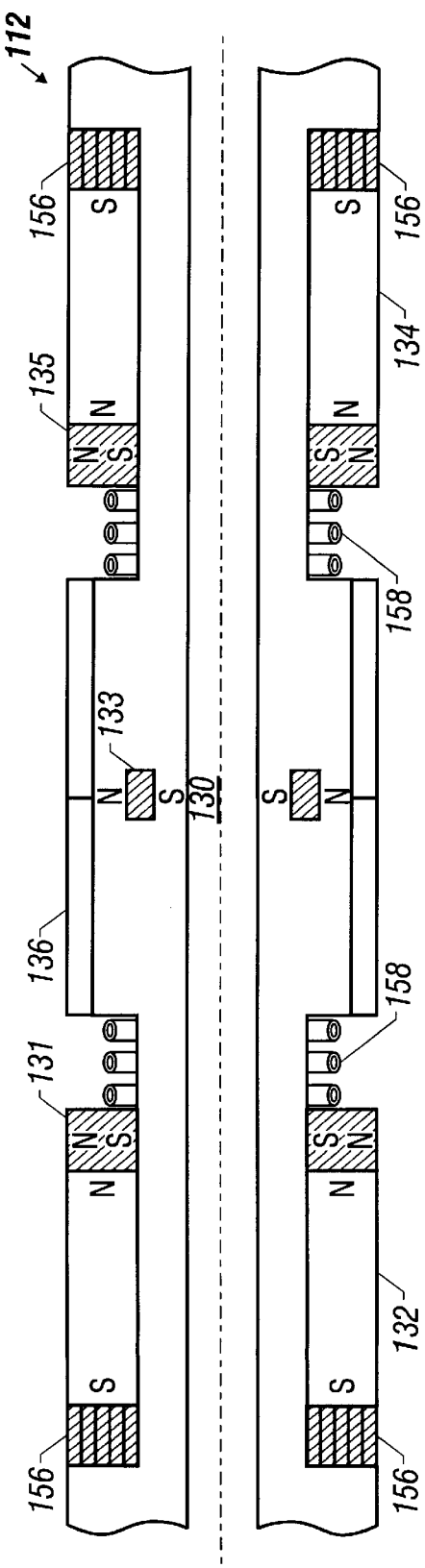
FIGS. 7A and 7B are sectional view of another embodiment of an NMR tool illustrating the use of the shaped memory alloy (SMA) elements in accordance with the present invention.
Figure 7B:
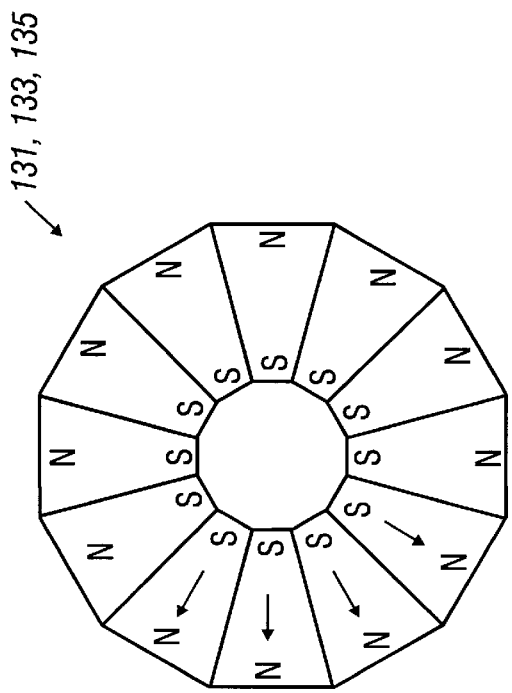

FIGS. 7A and 7B illustrate still another embodiment of the present invention wherein additional magnets 131, 133 and 135 are added to enhance and focus the static magnetic field produced by the main magnets 132 and 134. The main or large magnets 132 and 134 are tubular permanent magnets magnetized parallel to the longitudinal axis and are positioned with like magnetic poles facing each other to produce a radial static magnetic filed having a toroidal region of substantially uniform magnetic intensity. Additional magnets 131 and 135 include annular ring magnets disposed adjacent the main magnets 132 and 134 or adjacent the second set of elements for controlled movement such as the resilient elements 158. Another additional magnet 133 is a ring magnet disposed in the center of the two main magnets 132 and 134. The ring magnets 131, 133 and 135 are magnetized radially, that is, from its center outward as shown particularly in FIG. 7B, rather than axially, as are the main magnets 132 and 134. The RF coil 136 is placed about the center ring magnet 133 and is symmetrically disposed with respect to the main magnets 132 and 134. The RF coil 136 produces an RF field orthogonal to the radial static magnetic field produced by the main magnets 132 and 134. The spaced apart main magnets are controllably moved closer together under high temperatures and farther apart at lower or normal temperatures using the SMA elements 156 and elements 158 wherein the region of substantially uniform magnetic intensity of the static magnetic field is maintained substantially equal in size and distance from the NMR tool 112 at different locations in the borehole having different temperatures. Optionally, SMA elements could also be placed so as to move the ring magnets 131, 133, 135 in a radial direction to compensate for temperature changes.

FIGS. 8A and 8B illustrate still another embodiment of the present invention wherein a magnet assembly of the NMR tool 112 includes three magnets 302, 304 and 306 on a non-rotating sleeve 312 or pad and the temperature sensitive elements 150 for providing controlled movement of the magnets 302, 304 and 306. The NMR tool 112 shown in FIGS. 8A and 8B is suitable for wireline applications as well as MWD applications. The magnets 302, 304 and 306 produce a static magnetic field 308 having a saddle point at the center of a homogeneous field region as shown in FIG. 8B. By configuring the two N poles of magnets 302 and 306 to point at a face 310 of the sleeve 312 and the formation lying beyond the borehole wall, the magnet array appears at a distance like a magnetic N pole. However, the reversed pole positioning of magnet 304 substantially alters the magnetic field at close and intermediate distances from the NMR tool 112. The magnets 302, 304 and 306 produce a field anomaly within a defined region or volume of investigation 316 directly in front of the NMR tool 112 face. The position of the central magnet 304 with respect to the magnets 302 and 306 changes with a change in temperature. SMA elements 150 located adjacent the magnets 302, 304 and 306 provide for controlled movement of the central magnet 304 with respect to the magnets 302 and 306 and with respect to the changes in temperature wherein the region 316 of substantially uniform magnetic intensity of the static magnetic field is maintained substantially equal in size and distance from the NMR tool 112 at different locations in the borehole having different temperatures. Alternatively, the SMA elements could be configured in an arrangement (not shown) to move all three of the magnets relative to the borehole wall while maintaining the same relative positions between the three magnets.

FIG. 9 shows a permanent magnet assembly consisting of a vertically split cylinder having halves 172a, 172b. In the configuration shown, the poles are on the ends of the cylinder. As would be known to those versed in the art, such an arrangement of magnets produces a cylindrical region of examination in the borehole with a static magnetic field that is substantially parallel to the axis of the cylinder and RF coils (not shown) would have to be arranged to produce an RF field that is either radial or azimuthal. A suitable arrangement of SMAs 172a, 172b moves the two halves of the magnet apart from each other and closer to the borehole wall to compensate for temperature changes. The magnets in FIG. 9 could also be configured so that the North and South poles of the split cylinder are on the curved faces of the cylinder. The same arrangement of SMA elements moves the magnets relative to each other to adjust for temperature differences.

Figure 10:
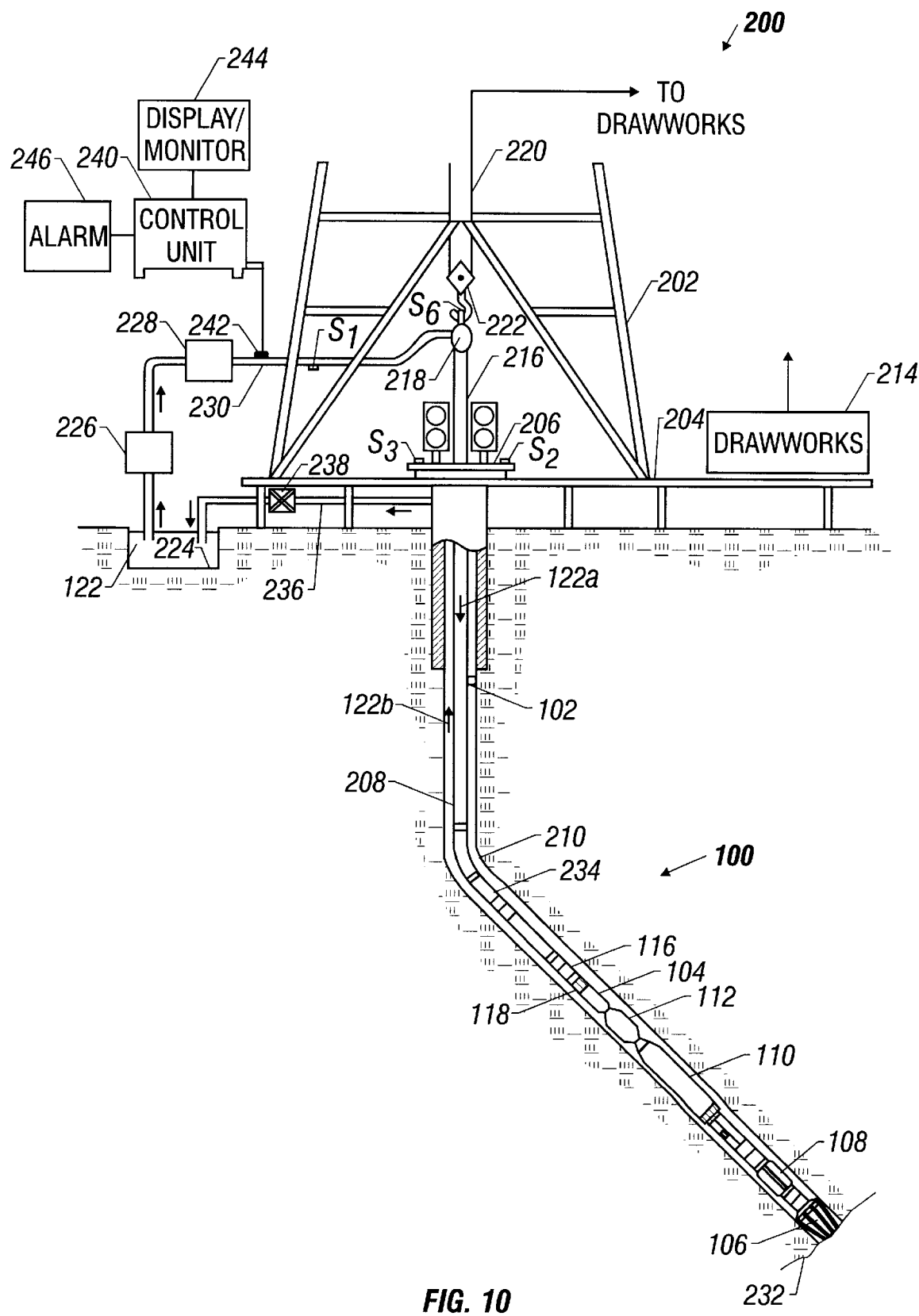
FIG. 10 illustrates a drilling system with the NMR tool in a wellbore.

FIG. 10 shows a schematic diagram of a drilling system 200 with the drill string 102 carrying the drilling assembly 100 (also referred to as the bottom hole assembly" or BHA") conveyed in a "wellbore" or "borehole" 210. The drilling system 200 includes a conventional derrick 202 erected on a floor 204 which supports a rotary table 206 that is rotated by a prime mover such as an electric motor (not shown) at a desired rotational speed. The drill string 102 includes a tubing (drill pipe or coiled-tubing) 208 extending downward from the surface into the borehole 210. The drill string 102 is pushed into the wellbore 210 when a drill pipe is used as the conveying member 208. For coiled-tubing a tubing injector, such as an injector 212, however, is used to move the tubing from a source thereof, such as a reel (not shown), to the wellbore 210. A drill bit 106, attached to the end of the drill BHA 100 is rotated to drill the wellbore 210. If a drill pipe is used, the drill string 102 is coupled to a drawworks 214 via a kelly joint 216, swivel 218 and line 220 through a pulley 222. Drawworks 214 is operated to control the weight on bit ("WOB"), which is an important parameter that affects the rate of penetration ("ROP"). The operations of the drawworks 214 and the tubing injector are known in the art and are thus not described in detail herein.

During drilling, the suitable drilling fluid 122 (commonly referred to as the "mud") from a mud pit (source) 224 is pumped into the tubing 208 by a mud pump 226. The drilling fluid 122 passes from the mud pump 224 into the drill string 102 (as shown by arrow 122a) via a desurger 228 and the fluid line 230. The drilling fluid 122 discharges at the borehole bottom 232 through openings (not shown) in the drill bit 106. The drilling fluid 122 returns to the mud pit 224 at the surface via the annulus 234 between the drill string 102 and the borehole 210 (as shown by arrow 122b) and a return line 236. A drill cutting screen 238 removes the drill cuttings from the returning drilling fluid 122b. A sensor $S_1$ in line 230 provides information about the fluid flow rate. A surface torque sensor $S_2$ and a sensor $S_3$ associated with the drill string 102 respectively provide information about the torque and the rotational speed of the drill string 102. Tubing injection speed is determined from the sensor $S_5$, while the sensor $S_6$ provides the hook load of the drill string 102.

A surface control unit or processor 240 receives signals from the downhole sensors and devices via a sensor 242 placed in the fluid line 230 and signals from sensors $S_1$–$S_6$ and other sensors used in the system 200 and processes such signals according to programmed instructions provided to the surface control unit 240. The surface control unit 240 displays desired drilling parameters and other information on a display/monitor 244 that is utilized by an operator to control the drilling operations. The surface control unit 240 preferably includes a computer or a microprocessor-based processing system, memory for storing programs or models and data, recorder for recording data and other peripherals. The control unit 240 is preferably adapted to activate alarms 246 when certain unsafe or undesirable operating conditions occur.

In some applications the drill bit 106 is rotated by only rotating the drill pipe 208. However, in many other applications, the downhole motor 110 (mud motor) is disposed in the drilling assembly 100 to rotate the drill bit 106 and the drill pipe 208 is rotated usually to supplement the rotational power, if required, and to effect changes in the drilling direction. The mud motor 110 is coupled to the drill bit 106 via a drive shaft (not shown) disposed in a bearing assembly 108. The mud motor 110 rotates the drill bit 106 when the drilling fluid 122 passes through the mud motor 110 under pressure. The bearing assembly 108 supports the radial and axial forces of the drill bit 106, the downthrust of the mud motor 110 and the reactive upward loading from the applied weight on bit.

The communication sub 116, power unit 118, MWD tool 104, and NMR tool 112 are all connected in tandem with the drill string 102. The drilling assembly 100 makes various measurements including the pulsed nuclear magnetic resonance measurements while the borehole is being drilled. The communication sub 116 obtains the signals and measurements and transfers the signals, using two-way telemetry, for example, to be processed on the surface. Alternatively, the signals can be processed using a downhole processor in the drilling assembly 100.

While preferred embodiments have been shown and described, various modifications and substitutions may be made thereto without departing from the spirit and scope of the invention. Accordingly it is to be understood that the present invention has been described by way of illustrations and not limitations.

What is claimed is:

1. A method for using a pulsed nuclear magnetic resonance (NMR) tool in earth formations traversed by a borehole comprising:

producing a static magnetic field having a first region of substantially uniform magnetic intensity at a first location in the borehole using at least two spaced-apart magnets in the NMR tool, the first location in the borehole having a first temperature;

moving the NMR tool to a second location in the borehole having a second temperature;

producing a static magnetic field having a second region of substantially uniform magnetic intensity at the second location in the borehole; and controllably moving the at least two spaced-apart magnets in a direction that is at least one of (i) relative to each other, and (ii) relative to the borehole, wherein the first region of substantially uniform magnetic intensity and the second region of substantially uniform magnetic intensity are substantially equal in size and distance from the NMR tool.

2. A method, as recited in claim 1, further comprising:
producing a radio frequency (RF) magnetic field using an RF antenna in the NMR tool in at least one of the first location in the borehole and the second location in the borehole, the RF magnetic field having a direction orthogonal to a direction of the static magnetic field; and
receiving an induced signal relating to a parameter of interest in the formations.

3. A method, as recited in claim 1, wherein the step of controllably moving the at least two spaced-apart magnets further comprises:
using at least one temperature sensitive element positioned adjacent said spaced-apart magnets.

4. A method, as recited in claim 3, wherein the at least one temperature sensitive element includes a shaped memory alloy element.

5. A method, as recited in claim 3, wherein the at least one temperature sensitive element includes a plurality of stacked shaped memory alloy elements.

6. A method, as recited in claim 3, wherein the at least one temperature sensitive element includes a bi-metallic element.

7. A method, as recited in claim 3, wherein the step of controllably moving the at least two spaced-apart magnets further comprises:
using at least one resilient element positioned adjacent said spaced-apart magnets.

8. A method, as recited in claim 7, wherein the at least one resilient element is selected from the group consisting of (i) a spring, and, (ii) a shaped memory element.

9. A method, as recited in claim 1, wherein the static magnetic field has a direction selected from the group consisting of (i) radial direction, (ii) a direction parallel to a longitudinal axis of the borehole, and (iii) a direction azimuthal with respect to a longitudinal axis of the borehole.

10. A method, as recited in claim 9, wherein the at least two spaced-apart magnets include at least two tubular magnets arranged wherein like magnetic poles are facing each other and wherein said first region of substantially uniform magnetic intensity and said second region of substantially uniform magnetic intensity each include a toroidal region of homogeneous radial magnetic intensity.

11. A method, as recited in claim 10, wherein the step of controllably moving the at least two spaced-apart magnets further comprises:
using a first set of temperature sensitive elements positioned adjacent outer ends of said at least two tubular magnets; and
using a second set of elements positioned adjacent inner ends of said at least two tubular magnets.

12. A method, as recited in claim 10, wherein said second temperature is higher than said first temperature and wherein the step of controllably moving the at least two spaced-apart magnets includes moving the at least two tubular magnets closer together.

13. A method, as recited in claim 10, wherein said second temperature is lower than said first temperature and wherein the step of controllably moving the at least two spaced-apart magnets includes moving the at least two tubular magnets farther apart.

14. A method, as recited in claim 11, wherein each of said first set of temperature sensitive elements includes at least one shaped memory alloy element.

15. A method, as recited in claim 11, wherein each of said second set of elements includes at least one shaped memory alloy element.

16. A method, as recited in claim 11, wherein each of said second set of elements includes a spring.

17. A method, as recited in claim 9, wherein the at least two spaced-apart magnets further comprise at least two outside magnets have like poles facing the formations and at least one centered magnet has a reversed pole position.

18. A method, as recited in claim 17, wherein the step of controllably moving the at least two spaced-apart magnets further comprises:
controllably moving the at least one centered magnet with respect to the at least two outside magnets.

19. A method, as recited in claim 1, wherein the static magnetic field has a longitudinal direction.

20. A method, as recited in claim 19, wherein the at least two spaced-apart magnets include at least two tubular magnets arranged wherein opposite magnetic poles are facing each other.

21. A method, as recited in claim 20, wherein the step of controllably moving the at least two spaced-apart magnets further comprises:
using a first set of temperature sensitive elements positioned adjacent outer ends of said at least two tubular magnets; and
using a second set of elements positioned adjacent inner ends of said at least two tubular magnets.

22. A method, as recited in claim 20, wherein said second temperature is higher than said first temperature and wherein the step of controllably moving the at least two spaced-apart magnets includes moving the at least two tubular magnets closer together.

23. A method, as recited in claim 20, wherein said second temperature is lower than said first temperature and wherein the step of controllably moving the at least two spaced-apart magnets includes moving the at least two tubular magnets farther apart.

24. A method, as recited in claim 21, wherein each of said first set of temperature sensitive elements includes at least one shaped memory alloy element.

25. A method, as recited in claim 21, wherein each of said second set of elements includes at least one shaped memory alloy element.

26. A method, as recited in claim 21, wherein each of said second set of elements includes a spring.

27. A method for using a pulsed nuclear magnetic resonance (NMR) tool in earth formations traversed by a borehole comprising:
producing a static magnetic field having a first region of substantially uniform magnetic intensity at a first location in the borehole using at least two spaced-apart magnets in the NMR tool, the first location in the borehole having a first temperature;
moving the NMR tool to a second location in the borehole having a second temperature;
producing a static magnetic field having a second region of substantially uniform magnetic intensity at the second location in the borehole; and controllably moving the at least two spaced-apart magnets in a direction that is at least one of (i) relative to each other, and (ii) relative to the borehole, using at least one temperature sensitive element positioned adjacent said spaced-apart magnets thereby making the first region of substantially uniform magnetic intensity and the second region of substantially uniform magnetic intensity substantially equal in size and distance from the NMR tool;
producing a radio frequency (RF) magnetic field using an RF antenna in the NMR tool in at least one of the first location in the borehole and the second location in the borehole, the RF magnetic field having a direction orthogonal to a direction of the static magnetic field; and receiving an induced signal relating to a parameter of interest in the formations.

28. A method, as recited in claim 27, wherein the step of controllably moving the at least two spaced-apart magnets further comprises:

using at least one resilient element positioned adjacent said spaced-apart magnets.

29. A method, as recited in claim 27, wherein the at least one temperature sensitive element includes a shaped memory alloy element.

30. A method, as recited in claim 27, wherein the at least one temperature sensitive element includes a plurality of stacked shaped memory alloy elements.

31. A nuclear magnetic resonance (NMR) tool conveyed in a borehole traversing a formation comprising:

at least two spaced-apart magnets in the NMR tool for producing a static magnetic field having a region of substantially uniform magnetic intensity in the formation;

at least one temperature sensitive element in the NMR tool for moving at least one of the at least two spaced-apart magnets for maintaining a substantially uniform size of the region of substantially uniform magnetic intensity when a temperature of the tool is changed;

an RF antenna in the NMR tool for producing a radio frequency (RF) magnetic field in having a direction orthogonal to a direction of the static magnetic field in said region of substantially uniform magnetic field intensity; and a receiving antenna for receiving an induced signal relating to a parameter of interest in the formation.

32. An NMR tool, as recited in claim 31, wherein the at least one temperature sensitive element includes a shaped memory alloy element.

33. An NMR tool, as recited in claim 31, wherein the at least one temperature sensitive element includes a plurality of stacked shaped memory alloy elements.

34. An NMR tool, as recited in claim 31, wherein the at least one temperature sensitive element includes a bi-metallic element.

35. An NMR tool, as recited in claim 31, further comprising:

at least one resilient element positioned adjacent said spaced-apart magnets for controllably moving the at least two spaced-apart magnets.

36. An NMR tool, as recited in claim 35, wherein the at least one resilient element is selected from (i) a spring, and (ii) a shaped memory element.

37. An NMR tool, as recited in claim 31, wherein the at least two spaced-apart magnets include at least two tubular magnets.

\* \* \* \* \*